United States Patent

[11] 3,616,923

| [72] | Inventor | Ernest K. Haley<br>134 Northwestern Parkway, Louisville, Ky. 40212 |
|---|---|---|
| [21] | Appl. No. | 49,805 |
| [22] | Filed | June 25, 1970 |
| [45] | Patented | Nov. 2, 1971 |

[54] BATHTUB SKIMMER
7 Claims, 1 Drawing Fig.

[52] U.S. Cl. ............................................... 210/242, 4/172.17, 4/173
[51] Int. Cl. ............................................... C02b 9/02
[50] Field of Search............................................ 210/169, 83, 242, 221, 222, 523; 4/171, 172, 173, 172.17, 198, 201, 202, 203, 204, 205, 206; 68/208; 15/1.7

[56] References Cited
UNITED STATES PATENTS

| 275,134 | 4/1883 | Burton.................... | 210/242 |
| 407,250 | 7/1889 | Roeske.......................... | 210/242 |
| 687,423 | 11/1901 | De Witt et al................. | 210/242 X |
| 3,152,341 | 10/1964 | Brase........................... | 4/206 |

FOREIGN PATENTS

| 911,963 | 12/1962 | Great Britain................ | 210/169 |

*Primary Examiner*—Reuben Friedman
*Assistant Examiner*—T. A. Granger
*Attorney*—David H. Semmes ABSTRACT: A bathtub skimmer to collect and remove floating material from the bath liquid surface, including a skimmer float balanced to ride in the liquid and having surface skimming openings partially submerged in the liquid and open to an interior float collecting chamber, a bathtub drain connection cup, and a flexible tube interconnecting the float and connection cup, operable to discharge collected material into the drain.

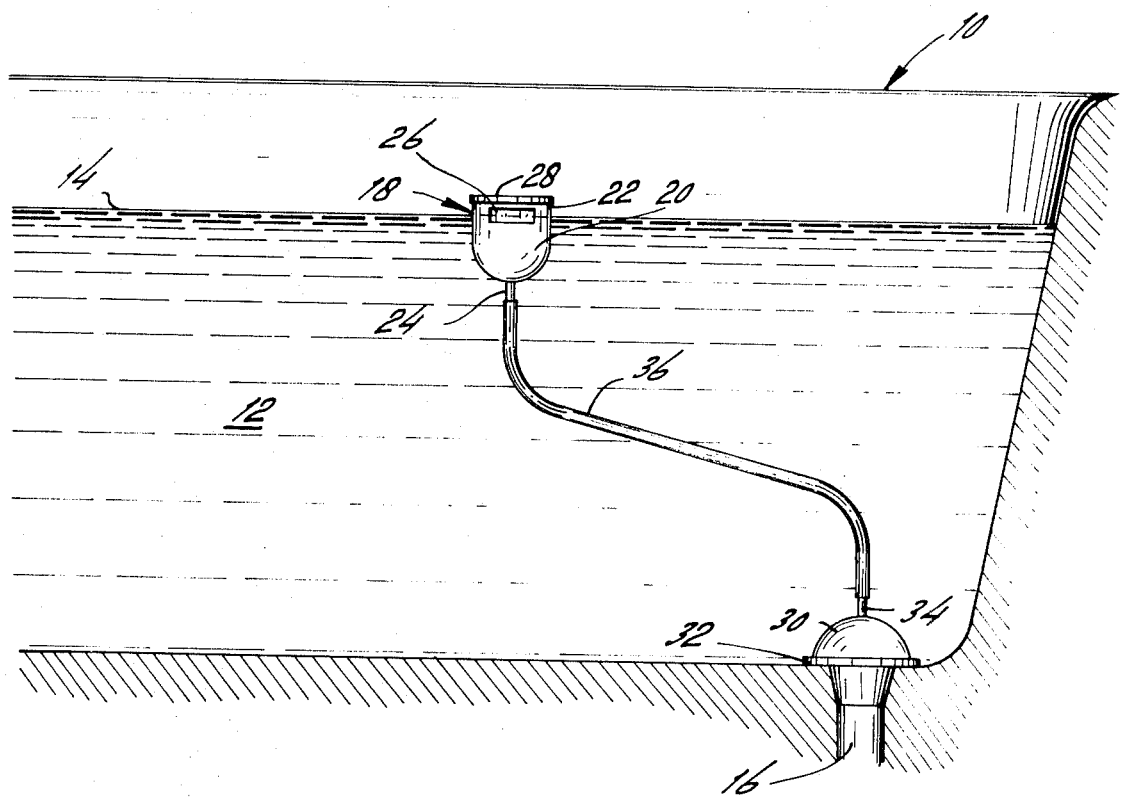

BATHTUB SKIMMER

BACKGROUND OF THE INVENTION

Liquid surface skimming devices to remove accumulated undesirable materials or substances from the surface of liquids used for many cleansing purposes are desirable and a need exists for such devices which are of a simple, inexpensive and portable nature. Especially desirable is a device practically feasible for use with bathtubs and the like to remove surface scum, body oil, hair, etc. from the surface of bath water and to minimize bathtub cleanup. While surface skimmer devices have heretofore been devised and utilized, such devices in many instances have been complex, expensive, difficult of use and operational attachment, many times requiring special drain installations.

SUMMARY OF THE INVENTION

The present invention is a liquid surface skimming device especially suitable for use in removing accumulated undesirable materials or substances from the liquid surface of bathtubs and the like. While adaptable for use for many types of liquid baths for cleansing or other purposes, the invention is particularly suitable for removing surface scum, body oil, hair, etc. from the surface of bath water and to minimize bathtub cleanup. The device is portable, inexpensive, simple to install or connect and does not require modification of equipment with which used nor expensive complex attaching means.

The skimmer is basically composed of a skimmer float, a drain connection cup, and a flexible connecting hose or tube. The float is so constructed as to ride in the liquid such as bath water with skimming slots or openings therein partially submerged in the liquid. Surface liquid containing undesirable materials flows into an interior float chamber and is discharged through the flexible hose and the drain connection cup out into a sewer system. The float preferably has a removable cover to permit necessary clean-up and the flexible hose or tube can be of a length to suit varying water depths or installations. The device is readily adaptable to various skimming uses by varying float size, number and size of skimming slots, varying flexible hose diameters and lengths, and different drain connections.

Additional objects and features of the invention will be more readily apparent from the following detailed description of an embodiment thereof when taken together with the accompanying drawing in which:

The figure is a schematic elevational view of a device in accordance with the invention as illustratively installed in a bathtub, fragmentarily shown.

Referring now to the drawing in more detail there is disclosed a skimmer device in accordance with the invention as installed, for illustrative purposes only, in a bathtub fragmentarily shown at 10. This application of the invention, when considering the meritorious features thereof, as will be delineated hereinafter, serves solely to disclose a practical embodiment of the apparatus but is not to be considered as limiting the scope or use of the invention since the principles as much more broadly applicable and useful.

The bathtub or other container has a body of liquid 12 such as bath water, liquid processing materials, swimming pool water and the like. The liquid or water level is indicated at 14. The container or bathtub 10 is provided with the normal standard drain at 16. The skimmer of the invention includes a skimmer float 18 of any desired and suitable shape and size commensurate with the use or application of the device. The body of the skimmer float is comprised of a material having preferably a normal buoyancy in the liquid with which used and has a hollow interior. The illustrated embodiment includes a bell-shaped body 20 having an open bottom at 22 and a connector spout 24. A skimming slot 26 is provided in and through the surface of body 20 and so positioned in the body that the designed buoyancy thereof will position the slot partially submerged in the liquid and partially exposed or open above the liquid surface. The configuration, size and/or number of skimming openings or slots can be varied as desired to provide desired skimming action. A removable cap 28 closes the open bottom 22 and, being removable, facilitates necessary or desired cleaning of the float body.

A drain connection cup 30 of a construction and material suitable for the intended use is adapted for engagement with and over the drain 16. The material and configuration of the connection cup are designed to provide a flexible sealing engagement with and over the drain. In the illustrated embodiment used in conjunction with a bathtub, the cup can be of rubber, plastic or the like having a general bell shape including a sealing flange 32 and a connector spout or tube portion 34. The connection cup can be either weighted or provided with magnetic attachment means or portions to maintain appropriate engagement with and over the bathtub drain. It will be apparent that placement of the connection cup with respect to the drain can be easily and quickly accomplished and renders the device completely portable.

The skimmer float and connection cup are interconnected by a flexible hose or tube 36 engaging and interconnecting respectively the connector spouts 24 and 34. Tube 36 can consist of rubber or plastic material depending upon intended usage and can vary in length as required to suit varying liquid or water depths.

The construction and mode of application and use are extremely simple, inexpensive and facile in nature. In operation, the float is so balanced as to ride in for example the bath water with the skimming slot or slots partially submerged. The surface water containing scum, oil, hair, etc. flows into the float chamber, through the flexible hose to the drain connection cup and out into the sewer system.

The device is particularly useful with bathtubs, especially for workers involved in positions entailing increased dirt labor environments, for bathing at the end of a work day to remove grime and dirt accumulated. The device of the invention serves to instantly and continuously clean scum from the bath level and, since it floats with the level, performs its cleaning function at any level of filling or emptying of the tub.

Manifestly minor changes and modifications in design, materials and application can be effected in invention without departing from the spirit and scope thereof as defined in and limited solely by the appended claims.

I claim:

1. A bathtub water surface impurity skimmer comprising:
    A. a bathtub and a body of water therein having impurities on the surface;
    B. a hollow skimmer float buoyantly floated in said water;
    C. a skimmer opening in said float extending partially above and partially below the surface of said water;
    D. an outlet drain in said tub;
    E. a drain connection cup removably engageable with said drain; and
    F. a flexible tube interconnecting the interior of said float and said connection cup;
    whereby surface water and surface impurities enter said float through the partially submerged opening therein, and discharge through said tube and connection cup into said drain.

2. The combination of claim 1, wherein said float includes a body of resilient buoyant material, and said float being so buoyantly balanced with respect to said water as to float in the water with said skimmer opening partially submerged therein.

3. A skimmer as claimed in claim 1, said skimmer float including a body portion having an open end and a connection spout, a closure cap removably mounted on and over said open end for cleaning access to said float, said spout being operatively engageable with an end of said flexible tube.

4. A skimmer as claimed in claim 3, wherein the body of said float consists of a resilient buoyant material and said float being balanced to ride in the liquid with the skimmer opening partially submerged therein.

5. A skimmer as claimed in claim 1, said drain connection cup including means adapted for sealing engagement with said bathtub drain.

6. A skimmer as claimed in claim 5, the drain connection cup means adapted for sealing engagement comprising magnetic attachment means operatively associated with said cup.

7. A skimmer as claimed in claim 5, wherein said connection cup is weighted for implementing the drain engagement.